United States Patent
Wineland

(10) Patent No.: US 7,311,076 B2
(45) Date of Patent: Dec. 25, 2007

(54) LOW FUEL PRESSURE WARNING SYSTEM

(75) Inventor: Richard Wineland, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/382,803

(22) Filed: May 11, 2006

(65) Prior Publication Data

US 2007/0261660 A1    Nov. 15, 2007

(51) Int. Cl.
F02B 77/08 (2006.01)
F02D 17/00 (2006.01)

(52) U.S. Cl. .............................. 123/198 D; 340/450.2

(58) Field of Classification Search ........... 123/198 D, 123/198 DB, 198 DC, 196 R; 340/450.2, 340/450.3, 451

See application file for complete search history.

(56) References Cited

U.S. PATENT DOCUMENTS 3,253,256 A * 5/1966 Hull ........................ 340/450.2
4,261,209 A * 4/1981 Hatsuno et al. ............... 73/753
4,413,248 A * 11/1983 Staerzl ....................... 340/459
4,429,670 A * 2/1984 Ulanet ..................... 123/198 D
6,672,147 B1 * 1/2004 Mazet ....................... 73/119 R
2001/0049579 A1   12/2001 Fujino et al.

* cited by examiner

Primary Examiner—Mahmoud Gimie
(74) Attorney, Agent, or Firm—Julia Voutras

(57) ABSTRACT

An internal combustion engine system having an internal combustion engine, a fuel source, a fuel filter for filtering fuel from the source to the engine, and a fuel pressure switch disposed between the fuel filter and the fuel source. An additional sensor is provided for sensing a condition of a substance fed to the engine. An output device is connected to both the fuel pressure switch and the additional sensor for indicating when either the fuel pressure switch indicates an improper fuel pressure condition or the additional sensor indicates the sensed condition is an unwanted condition.

2 Claims, 3 Drawing Sheets

LOW FUEL PRESSURE WARNING SYSTEM

TECHNICAL FIELD

This invention relates generally to low fuel pressure warning systems and more particularly to low fuel pressure warning systems adapted for use in internal combustion engines.

BACKGROUND

As is known in the art, low fuel pressure in internal combustion engines, particularly vehicles diesel engines, is as serious a concern as low oil pressure. Low fuel pressure causes customers concerns for poor engine performance due to a broken fuel injector. The poor performance can be hard starts, rough idle, lack of power, excess smoke, and other problems that result from one or more broken fuel injectors. The fuel injector breaks when the fuel pressure is low because fuel must be present to internally dampen injector plunger forces. The lack of fuel can damage or break many internal injector components such as springs, check plates, plunger pistons, and control valve body screws. When the fuel injector breaks it will no longer deliver the proper amount of fuel at the proper time.

SUMMARY

In accordance with the present invention, an internal combustion engine system is provided having an internal combustion engine, a fuel source, a fuel filter for filtering fuel fed to the engine from the fuel source, and a fuel pressure switch disposed between the fuel filter and the fuel source for sensing pressure of the fuel being fed to the engine. An additional sensor is provided for sensing a condition of a substance fed to the engine. An output device is connected to both the fuel pressure switch and the additional sensor for indicating when either the fuel pressure switch indicates an inadequate fuel pressure condition or the additional sensor indicates the sensed condition is an unwanted condition.

In one embodiment, the additional sensor is an oil pressure sensor.

In one embodiment, the additional sensor is a water-in-fuel sensor.

In one embodiment, the fuel pressure switch, the additional sensor, and the output device are connected serially to a voltage source.

In one embodiment, the fuel pressure switch and the additional sensor are connected in parallel to form a circuit, such circuit being serially connected to a voltage source, With such system, a low cost solution is provided for production and field service by adding a low pressure fuel switch to the downstream side of the final fuel filter and wiring the switch to an existing low oil pressure switch. Like the low oil pressure switch, the low fuel pressure switch will close when the fuel pressure falls below a predetermined value. Since it is wired with the low oil pressure switch, improper pressure on either switch will cause the warning light, for example, on the dash to illuminate. Typically, low oil pressure occurs at low engine speeds whereas low fuel pressure typically occurs at high engine speeds. For service, one can disconnect each sensor in turn to determine if the light is lit because of low fuel or low oil pressure.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
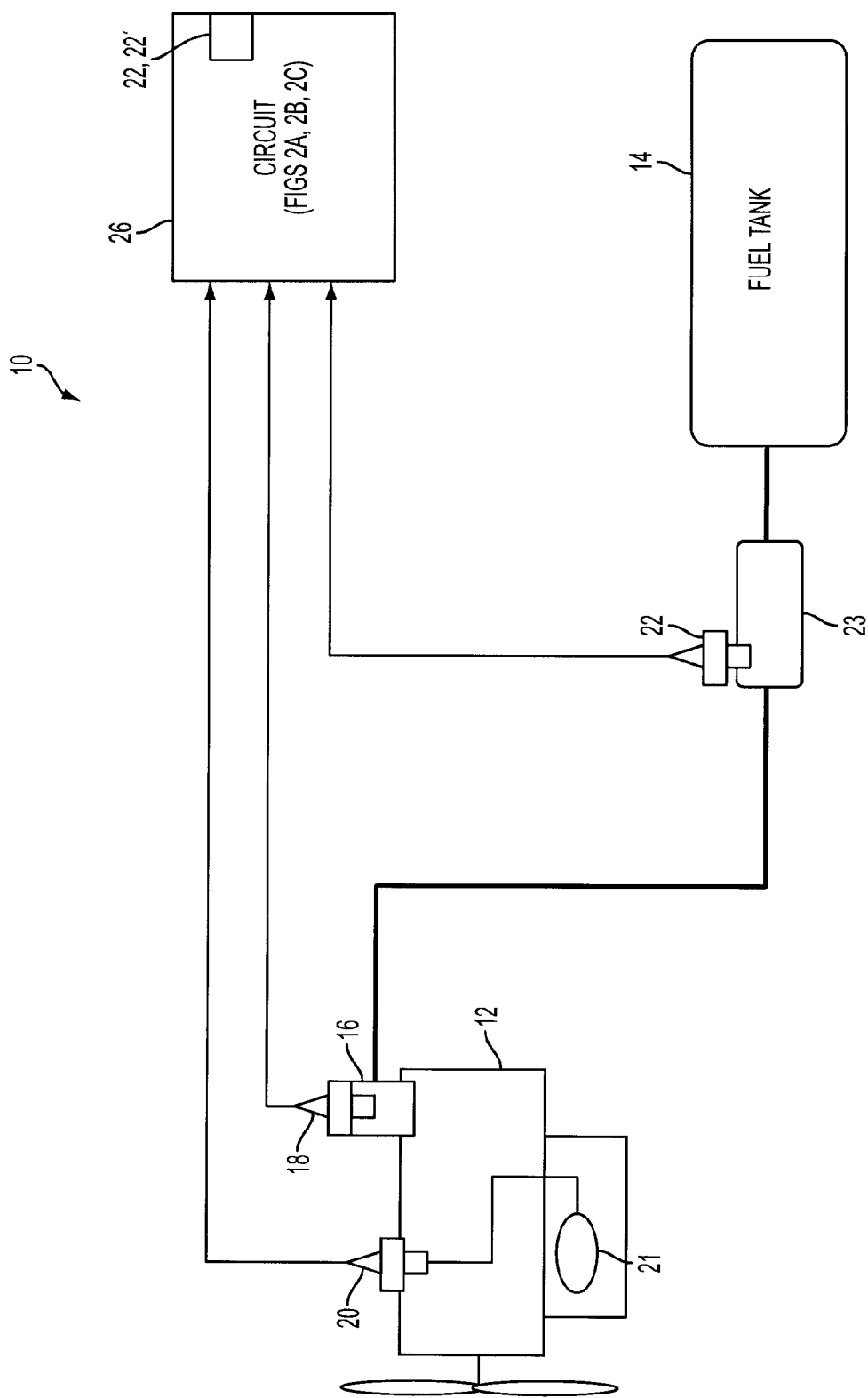
FIG. 1 is a diagram of an internal combustion engine system according to the invention.

Referring now to FIG. 1, an internal combustion engine system 10 is shown having an internal combustion engine 12, a fuel source, here, for example, diesel fuel, stored in a fuel tank 14, a fuel filter 16 for filtering fuel fed to the engine from the fuel source 14, and a fuel pressure switch 18 disposed between the fuel filter 16 and the fuel source 14 for sensing pressure of the fuel being fed to the engine 12. An additional sensor, here for example, either an oil pressure switch 20 and/or a water-in-fuel (WIF) sensor 22, is provided for sensing a condition of a substance fed to the engine 12. Here such substance is oil in the case of the oil pressure switch 20 and water in the fuel in the case of a WIF sensor 22. A fuel pump 23 pumps fuel from the tank 14 and oil pump 21 pumps the oil.

An output device 32 included in circuit 26 (FIGS. 2A, 2B and 2C) is connected to both the fuel pressure switch 18 and the additional sensor here oil pressure switch 20 or WIF sensor 22, for indicating when either the fuel pressure switch 18 indicates an inadequate fuel pressure condition or the additional sensor either oil pressure switch 20 or WIF sensor 22, as the case may be, indicates the sensed condition is an unwanted condition (i.e., low oil pressure in the case of oil pressure switch 20 being used or excess water in the fuel in the case of the WIF sensor 22).

Figure 2B:
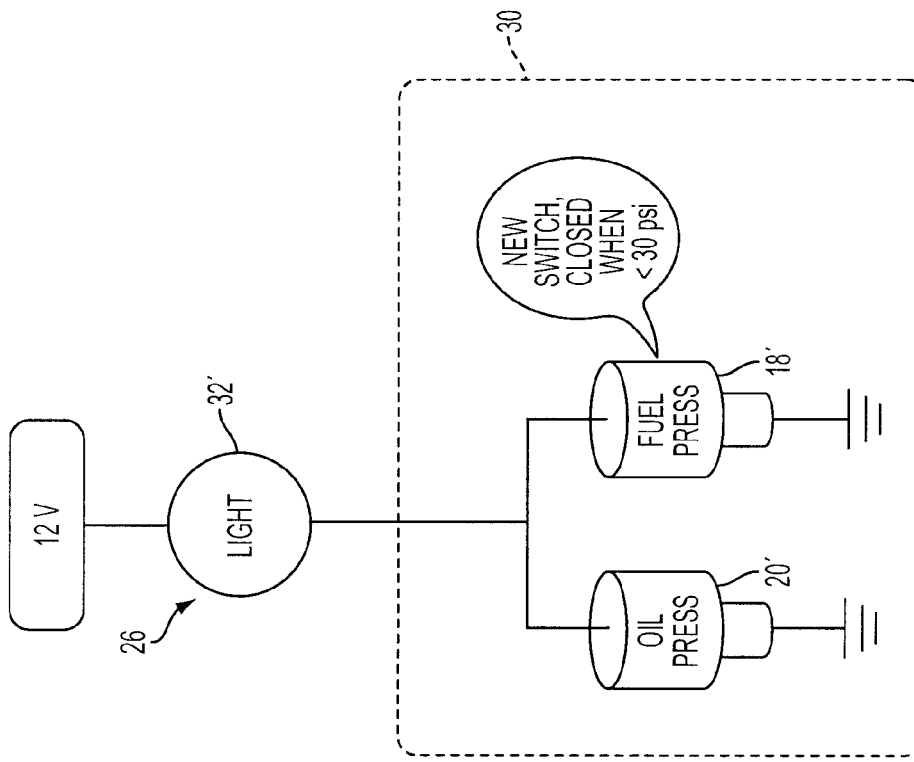
FIGS. 2A, 2B and 2C are circuits used in the internal combustion engine system of FIG. 1 according to various embodiments of the invention, comprising.
Figure 2A:
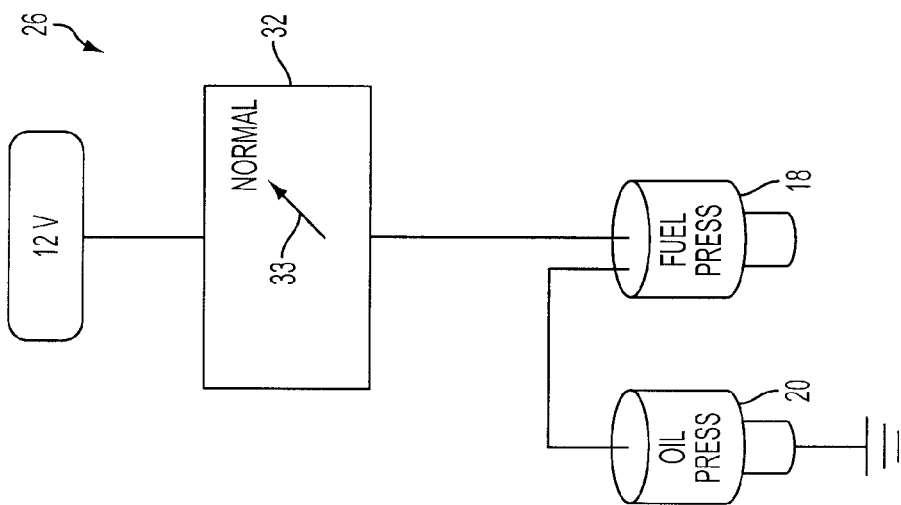

Referring now to FIG. 2A, the fuel pressure switch 18, the additional sensor, here the oil pressure switch 20 and the output device 32, here a two position gauge, are connected serially to a voltage source, 12V. The fuel pressure switch 18 is in closed position when the fuel pressure is greater than a predetermined fuel pressure level, for example greater than 30 psi and is in an open position when the fuel pressure level is less than the predetermined fuel pressure level. The additional sensor, here the oil pressure switch 20 is in a closed position when the sensed condition, here oil pressure, is a desired condition, here greater than a predetermined oil pressure level, for example 6 psi, and in an open position when the sensed condition is in the unwanted condition. Thus, if either the fuel pressure falls below 30 psi or the oil pressure falls below 6 psi, current is inhibited by the open one of the switches 18, 20 from passing through the gauge 32 and the gauge moves its pointer 33 to "0"; however, if both the fuel pressure is greater than 30 psi and the oil pressure is greater than 6 psi, current passes through gigue 32 and moves pointer 33 to the "normal" position.

Referring to FIG. 2B, here the fuel pressure switch 18' and the additional sensor, here oil pressure switch 20' are connected in parallel to form a circuit 30, such circuit 30 being serially connected to a voltage source here a 12 volt source through output device 32', here a warning light. The fuel pressure switch 18' is in closed position when the fuel pressure is less than a predetermined fuel pressure level, for example less than 30 psi and is in an open position when the fuel pressure level is greater than the predetermined fuel pressure level. The additional sensor, here the oil pressure switch is in an open position when the sensed condition, here oil pressure, is a desired condition, here greater than a predetermined oil pressure level, for example 6 psi, and in an closed position when the sensed condition is in the unwanted condition. Thus, if either the fuel pressured falls below 30 psi or the oil pressure falls below 6 psi, the warning light is lit.

Figure 2C:
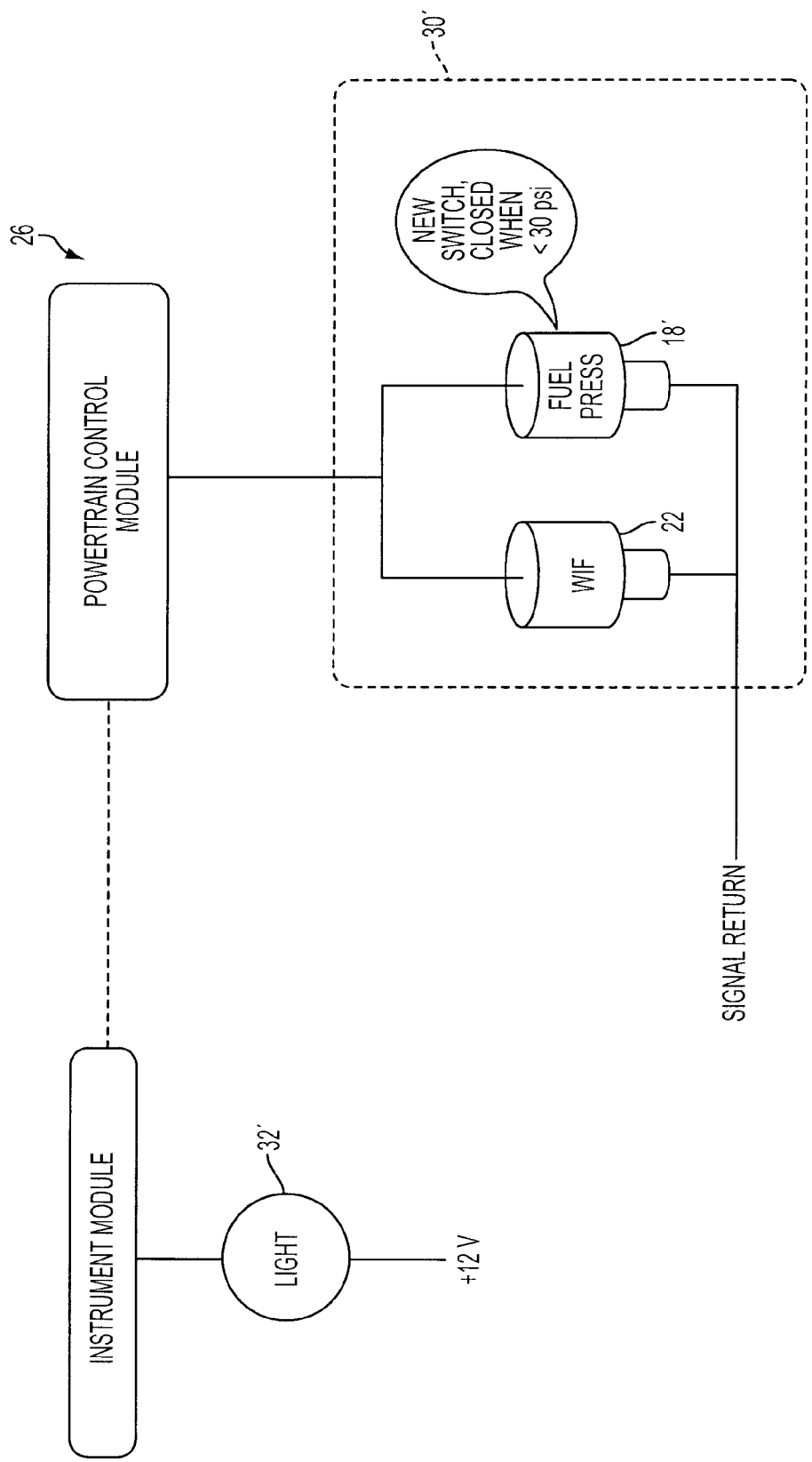

Referring to FIG. 2C, here the fuel pressure switch 18' and the additional sensor, here WIF sensor 22 are connected in parallel to form a circuit 30', such circuit 30' being serially connected to a voltage source here a 12 volt source through output device 32', here a warning light, and a power control module 40. The fuel pressure switch 18' is in closed position when the fuel pressure is less than a predetermined fuel pressure level, for example less than 30 psi and is in an open position when the fuel pressure level is greater than the predetermined fuel pressure level. The additional sensor, here the WIF 22 has a low resistance (i.e., lower than a predetermined resistance) when there is water in the fuel, i.e., when the sensed condition is in the unwanted condition. Thus, if either the fuel pressured falls below 30 psi or there is excess water in the fuel, the warning light is lit.

A number of embodiments of the invention have been described. Nevertheless, it will be understood that various modifications may be made without departing from the spirit and scope of the invention. For example, other types of circuit configurations are possible. Accordingly, other embodiments are within the scope of the following claims.

What is claimed is:

1. An internal combustion engine system, comprising:
   an internal combustion engine;
   a fuel source;
   a fuel filter for filtering fuel fed from the source to the engine;
   a fuel pressure switch disposed between the fuel filter and the fuel source for sensing pressure of the fuel being fed to the engine is less than a predetermined fuel pressure level;
   an water in fuel sensor connected in parallel with the fuel pressure switch, such water in fuel sensor having a resistance lower than a predetermined resistance when there is excess water in the fuel; and
   an output device connected to both the fuel pressure switch and the water in fuel sensor for indicating when either the fuel pressure falls below the predetermined fuel pressure level or when there is excess water in the fuel.

2. The system recited in claim 1 including a power control module having an input terminal and wherein the water in fuel sensor and the fuel pressure switch are connected to a common node, and wherein the common node is connected to the input terminal of the power control module.

* * * * *